United States Patent [19]
Ganesh et al.

[11] Patent Number: 5,802,369
[45] Date of Patent: Sep. 1, 1998

[54] ENERGY-BASED WAVELET SYSTEM AND METHOD FOR SIGNAL COMPRESSION AND RECONSTRUCTION

[75] Inventors: Chidambar Ganesh; Chung T. Nguyen, both of Bristol; Sherry E. Hammel, Little Compton; Margaret Marafino, Middletown, all of R.I.

[73] Assignee: The United States of America as represented by the Secretary of the Navy, Washington, D.C.

[21] Appl. No.: 641,135

[22] Filed: Apr. 22, 1996

[51] Int. Cl.[6] .................................................. G06K 9/36
[52] U.S. Cl. ...................... 395/200.77; 382/232; 382/248
[58] Field of Search ........................... 395/200.18, 2.91, 395/2.94, 200.77; 382/232, 233, 235, 248, 251, 162, 166; 348/384, 395, 403

[56] References Cited

U.S. PATENT DOCUMENTS

| | | | |
|---|---|---|---|
| 5,262,958 | 11/1993 | Chui et al. | 364/487 |
| 5,497,777 | 3/1996 | Abdel-Malek et al. | 128/660.07 |
| 5,526,446 | 6/1996 | Adelson et al. | 382/275 |
| 5,528,725 | 6/1996 | Hui | 395/245 |
| 5,619,998 | 4/1997 | Abdel Malek et al. | 128/660.06 |

OTHER PUBLICATIONS

Ganesh et al., "Energy–Based Method for Signal Compression and Reconstruction with Wavelets", Technical Report of Naval Undersea Warfare Center, abstract only, Sep. 30, 1995.

Nguyen et al., "Advanced Techniques for Signal and Image Compression/Reconstruction with Wavelets", Technical Report of Naval Undersea Warfare Center, Abstract Only, May 12, 1995.

Wang et al., "Image Coding Based on Energy Estimation and Reordering of Wavelets", Proceedings of the 1996 34d International Conference on Signal Processing, Abstract Only, 1996.

Kadambe, "On the Choice of a Wavelet, and the Energy and the Phase Distributions of the Wavelet Transform", IEEE 1992.

*Primary Examiner*—James P. Trammell
*Assistant Examiner*—Patrick Assouad
*Attorney, Agent, or Firm*—Michael J. McGowan; Michael F. Oglo; Prithvi C. Lall

[57] ABSTRACT

A system and method for signal processing using wavelets are disclosed. The method includes the steps of generating a wavelet decomposition tree modeling the signal. The tree includes a plurality of levels of wavelet coefficients representative of the signal. The method further includes determining the actual number of wavelet coefficients available at each of the plurality of levels; measuring mean energy for each of the plurality of levels; and determining a desired number of wavelet coefficients for each of the plurality of levels based on the mean energy determined in the step of measuring. The mean energy in the step of measuring for each of the plurality of levels is indicative of the desired number of wavelet coefficients selected from each of the plurality of level. The method further includes the step of retaining the desired number of wavelet coefficients and forming a compressed representation of the signal.

20 Claims, 7 Drawing Sheets

ENERGY-BASED WAVELET SYSTEM AND METHOD FOR SIGNAL COMPRESSION AND RECONSTRUCTION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention is directed to signal processing, and more particularly, to a system and method for processing a signal by compressing and reconstructing the same, wherein the system and method uses wavelets and/or wavelet transforms for compressing the signal, which wavelets are selected at various levels of a wavelet decomposition tree used for modeling the signal, based on the mean energy at each level.

(2) Description of the Prior Art

Evolving remote sensing systems for today's undersea applications have resulted in ever-increasing demands for data storage and communication bandwidth. With an expected increase in data traffic volume and the consequent overloading of storage capacity and transmission channels, the need for signal compression becomes essential. Signal compression techniques can reduce the volume of data by exploiting the statistical redundancies in data such as spatial redundancy due to correlation between neighboring sensor measurements, temporal redundancy due to correlation between successive segments of the same sensor signal, and spectral redundancy between bands of multispectral signals.

The redundancy in signal data is described above in terms of correlation between data samples. The purpose of data compression is to remove such redundancies and to prepare the data for digital transmission or storage. The basic elements of a data compression system are depicted in FIG. 1. The first step is to process the signal by an operation that attempts to remove as much as possible of the data correlation. In the second step, this decorrelated data must be properly quantized; then, in the third step, the quantized samples are coded into a form suitable for transmission (coding may include such criteria as error detection or correction). Steps 2 and 3, quantization and coding, are basically governed by the same considerations no matter what particular decorrelation scheme is chosen in step 1. It is in the first step that signal decomposition and decorrelation are performed for data compression.

One of the conventional data compression methods is the covariance or Karhunen-Loeve (K-L) transformation. In this method, the data is decomposed into a set of uncorrelated components of decreasing statistical significance. Compression can be achieved by selecting those components of greatest statistical importance, and discarding the rest. Even though the K-L transformation provides perfect data decorrelation, it is not an efficient process. That is, for applications with high data rates, the computational requirements are extremely expensive.

The discrete Fourier transform (DFT) has had a great impact on many applications of digital signal processing, including signal compression and reconstruction. Not only does the DFT provide data decorrelation, but is also greatly reduces the computational requirements. A standard approach for analyzing a signal is to decompose it into a sum of simple building blocks. The fast Fourier transform (FFT) and discrete cosine transform (DCT) are the most well-known examples. However, since the basis vector formed by the Fourier kernel function is a cosine basis, it does not have compact support or finite energy. Thus, a large number of transform coefficients may be required for containing a significant fraction of the total signal energy.

In the past several decades, signal compression techniques have been mainly performed with traditional spectral decompositions such as the DFT and FFT. Signal compression with traditional techniques produces no discernible degradation in the reconstructed signal at low compression ratios (4:1 to 5:1). As demands for high compression ratios increase, a moderate quality reconstructed signal can be obtained with traditional techniques at compression ratios up to 40:1 or so. However, for compression ratios higher than 40:1, the performance of traditional techniques deteriorates rapidly, and the reconstruction signal is degraded severely and is generally not useful. To this end, researchers in the signal and image processing community have been searching for better techniques for data compression.

Wavelets and wavelet transforms have recently emerged as a useful alternative for many applications in signal processing. Since their basic functions have compact support and their transforms have good localization in both time and frequency domains, wavelets have opened up new avenues for improving signal compression methods. By wavelet decomposition of a given function g(t) one can represent that function as follows $$g(t) = \sum_n \sum_i c_{ni} \psi_{ni}(t) \qquad (1)$$

where n and i range over Z and $Z^2$, respectively, and the $C_{ni}$ are the coefficients. Each of the function $\psi_{ni}(t)$ belongs to one of a finite number of families $\{\psi_{ni}(t)\}$, and the parameters n and i are related to the scale and location of this function.

One way to apply wavelet decompositions for data compression is to approximate g(t) by a finite sum of functions $\psi_{ni}(t)$. Since the values of the functions $\psi_{ni}(t)$ stay the same, the information content of the signal g is captured in the coefficients $c_{ni}$. The signal g(t) is compressed by (1) selecting the largest coefficients, and (2) applying traditional coding techniques to the sequence of selected coefficients based on a universal threshold level. Because errors introduced by compression depends only on the size of the coefficients, one can eliminate the smallest coefficients and still have a reasonably good approximation of the original signal. However, when large compression ratios and high quality reconstruction are required, the performance of the global threshold technique is inadequate. In many undersea applications such as sidescan sonar images and underwater acoustic signals, noise and other interference contribute a great deal in degrading signals and images. The need for a new technique that can improve the performance of data compression thus becomes important.

The prior art includes several signal compression systems and methods directed to signal processing, which are discussed below, none of which base selection of wavelet coefficients on mean energy.

U.S. Pat. No. 5,453,945 to Tucker et al. discloses a method for decomposing signals into efficient time-frequency representations for data compression and recognition. The system and method uses adaptive wavelet basis functions and concentrates a signal or image's information to a higher degree than methods based on the discrete fourier transform, the discrete cosine transform, the standard wavelet transform and known adaptive transform techniques. The purpose of the system and method is to enable data signals and images to be stored and transmitted. The time-frequency plane is broken up into subspaces. The method determines the optimum basis function for each of the subspace regions. Once decomposition is determined, basis functions are chosen such that much of the information in the signal is contained in a small number of coefficients. The coefficients are selected based on (i) magnitude and (ii) relative occurrence with respect to increasing address space. The resulting coefficients form a set that represents the signal a concentrated manner. However, while a compression techniques using wavelet transforms is disclosed, and coefficients are ordered, no energy based formula is disclosed for selecting the wavelet coefficients. Accordingly, a less efficient system is disclosed than that achieved by the present invention.

U.S. Pat. No. 5,293,434 to Feig et al. discloses a technique for use in a transform coder for imparting robustness to compressed image data through use of global block transformations. In this system, robustness is provided, in the case of images, by passing localized image data, i.e. either pixel values or transformed, illustratively discrete cosine transform (DCT), image coefficient values therefor, through a global block transform such as a global block Hadamard transform, prior to compression coding. This is done in order to produce holographic-like compressed data for subsequent transmission and/or storage. Globally transforming an image in this fashion spreads the image data in each block of pixels in that image or in the transform coefficients therefor in a regularly ordered pre-defined global manner throughout the entire image to create what is, in effect, intentionally "smeared" image data. By subjecting the "smeared image" data upon decompression to an inverse global block Hadamard transformation, such as an inverse global block Hadamard transformation, then, even if a portion of the smeared data for an image is obliterated during transmission or playback, the entire image can still be reconstituted, though to somewhat degraded quality, from the remaining smeared data. Accordingly, while a compression technique using transforms which are created by discrete cosine transform is disclosed, there is no mention of energy based wavelet coefficient selection. Similar to the above discussed system and technique, a system and technique which is less efficient than the instant invention is disclosed.

U.S. Pat. No. 4,751,742 to Meeker discloses a method and system for the priority coding of transform coefficients. The system and method is for the prioritization of transform domain coefficient data representing sources such as, but not limited to, single images and images in motion, so as to produce a data rate not exceeding the capacity of the transmission channel used in transmitting the data to a receiver. Simultaneously, the system and technique minimizes the perceived distortion when the image is reconstructed at the receiver. One disclosed aspect relates in particular to the transmission of Pyramid Transform coefficients from a single image over a fixed data rate transmission channel. In effect, a sequence of multiple image reconstructions is performed at the receiver during the time period required for the transmission of all the coefficient data representing the image. The reconstructed image gradually increases in detail. While a system and technique is disclosed which prioritized the coding of transform domain coefficients, it uses the zonal coding method which selects lower frequency coefficients. Accordingly, there is no disclosure of energy based selection of coefficients.

U.S. Pat. No. 4,045,616 to Sloane discloses a vocoder system. In this system and method, a Laplace transform is obtained for contiguous or overlapping frames of speech (or other signals) and polepair parameters (frequency, damping, magnitude and phase) are selected for transmission so as to preserve maximum energy. Speech is reconstructed from the transmitted parameters, using, for example, a damped sine wave as the equivalent of a polepair. No separate pitch determination is made, nor is a voiced/unvoiced decision required. While this device discloses a voice coder that uses Laplace transforms with energy thresholding means to select transforms, the energy based selection of wavelet coefficients is not disclosed.

There exists a need, therefore, for an improved and more efficient signal processing system and method which uses wavelet coefficients for compressing and reconstructing a signal, which wavelet coefficients are selected from a plurality of levels of a wavelet decompression tree based on the mean energy at each level.

SUMMARY OF THE INVENTION

The primary object of this invention is to provide a system and method for signal processing which uses wavelet coefficients for compressing and reconstructing signals, which is a more efficient means of retention of information than previously known systems and methods which coefficients are selected from a broader spectrum of decomposition levels than in known systems and methods.

Still another object of this invention is to provide a system and method for signal processing using wavelet coefficients, which system and method uses local thresholding wherein each level of a wavelet decomposition tree used therefor has an independent threshold for coefficient selection, thereby increasing the efficiency and accuracy of signal reconstruction.

Another object of this invention is to provide an improved and more efficient signal processing system and method, which system and method uses wavelet coefficients for compressing and reconstructing signals, wherein such wavelet coefficients are selected deep into a wavelet decomposition tree according to respective increases in mean energy at these depths.

And still another object of this invention is to provide a signal processing system and method which uses wavelet coefficients for compressing and reconstructing the processed signal, which wavelet coefficients are selected from an increased plurality of levels of a wavelet decomposition tree based on the mean energy of each level.

The foregoing objects and advantages disclosed herein are achieved by the signal processing system and method of the present invention. The system comprises means for generating a wavelet decomposition tree modeling the signal. The tree includes a plurality of levels of wavelet coefficients representative of the signal. The system further includes means for determining the number of wavelet coefficients available at each of the plurality of levels; means for measuring mean energy for each of the plurality of levels; and means for determining a desired number of wavelet coefficients for each of the plurality of levels based on the mean energy. The mean energy measured for each of the plurality of levels is indicative of the desired number of wavelet coefficients selected from each of the plurality of levels. The system further includes means for retaining the desired number of wavelet coefficients and forming a compressed representation of the signal.

The method of the present invention comprises the steps of generating a wavelet decomposition tree modeling the signal. The tree includes a plurality of levels of wavelet coefficients representative of the signal. The method further includes determining the actual number of wavelet coefficients available at each of the plurality of levels; measuring mean energy for each of the plurality of levels; and determining a desired number of wavelet coefficients for each of the plurality of levels based on the mean energy determined in the step of measuring. The mean energy in the step of measuring for each of the plurality of levels is indicative of the desired number of wavelet coefficients selected from each of the plurality of level. The method further includes the step of retaining the desired number of wavelet coefficients and forming a compressed representation of the signal.

The details of the present invention are set out in the following description and drawings wherein like reference characters depict like elements.

DESCRIPTION OF THE PREFERRED EMBODIMENT

Figure 2:
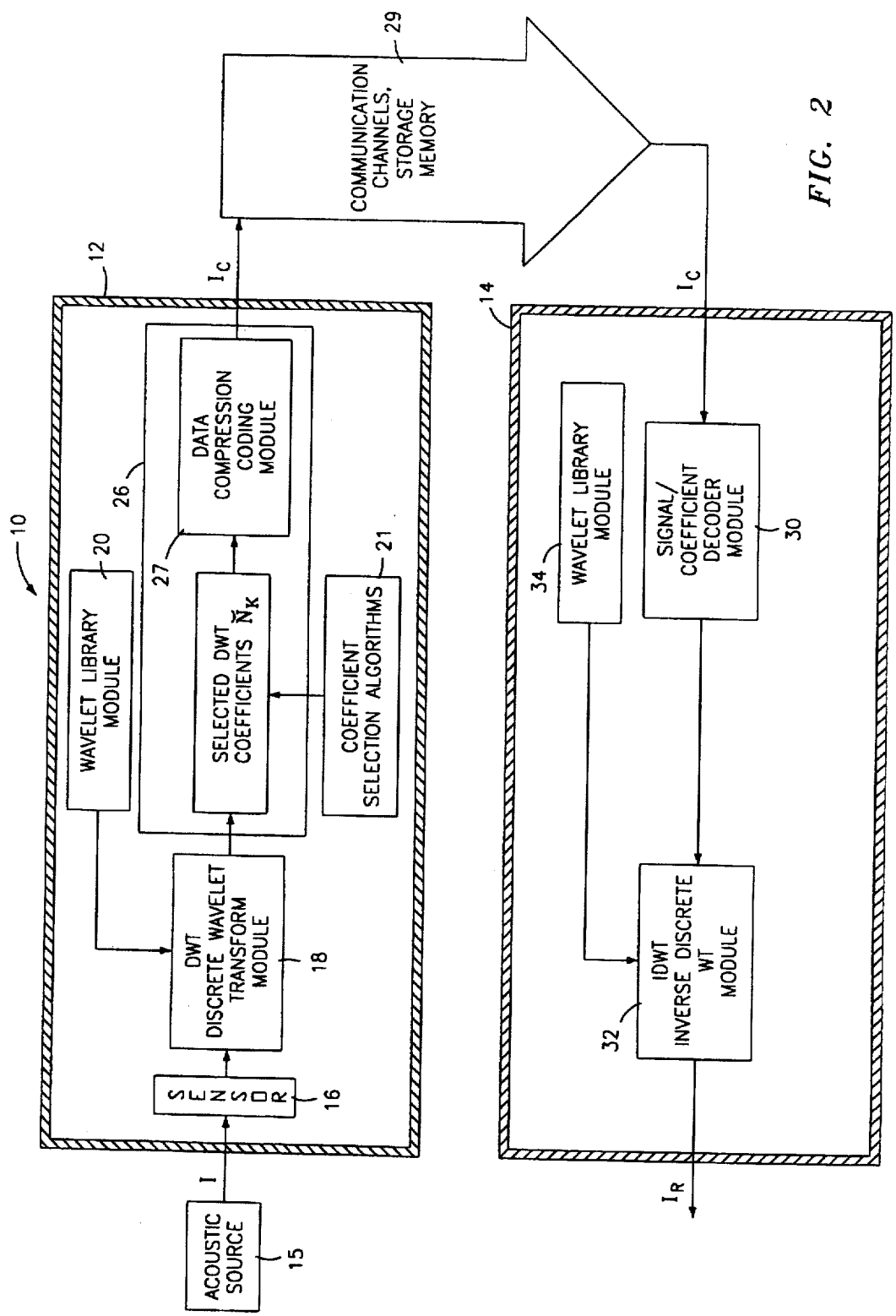
FIG. 2 is a schematic representation of the system of the present invention using wavelet coefficient selection based on mean energy and includes a signal compression subsystem and a signal reconstruction subsystem.

Referring now to the drawings in detail, there is shown in FIG. 2 a schematic diagram of the mean energy based system and process of the present invention for compressing and reconstructing signals with wavelets, designated generally as 10. System 10 includes a signal compression subsystem 12 and a signal reconstruction subsystem 14.

Figure 1:
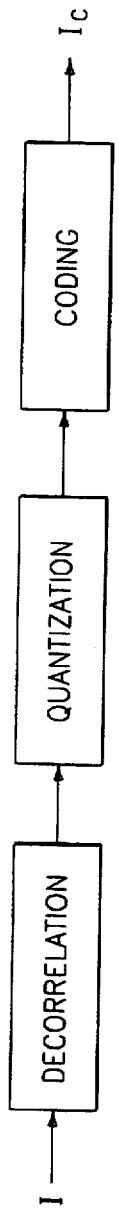
FIG. 1 is a simplified schematic diagram of the components of a prior art data or signal compression system.
Figure 3:
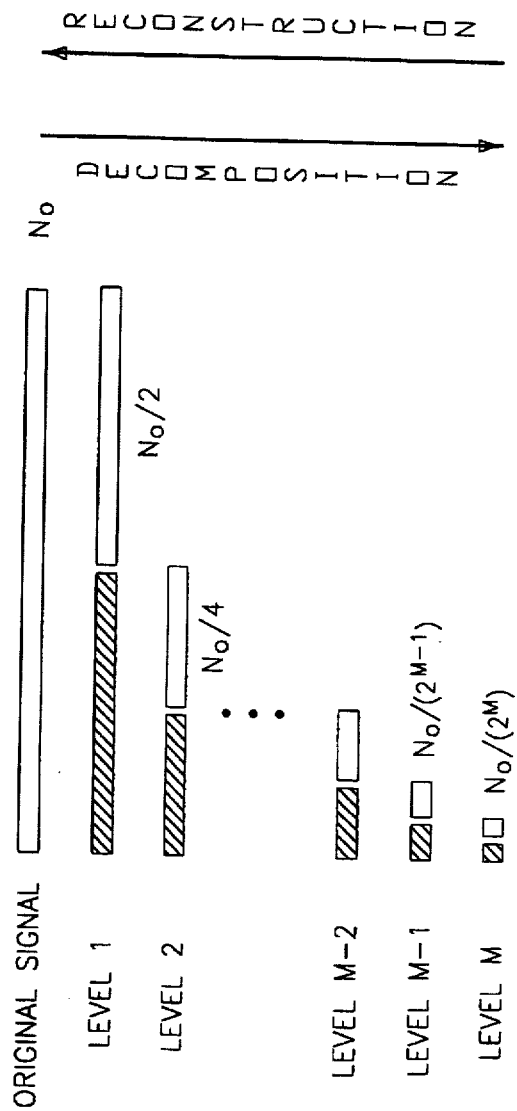
FIG. 3 is a diagrammatic representation of a wavelet decomposition tree used in accordance with the principles of the present invention.
Figure 5:
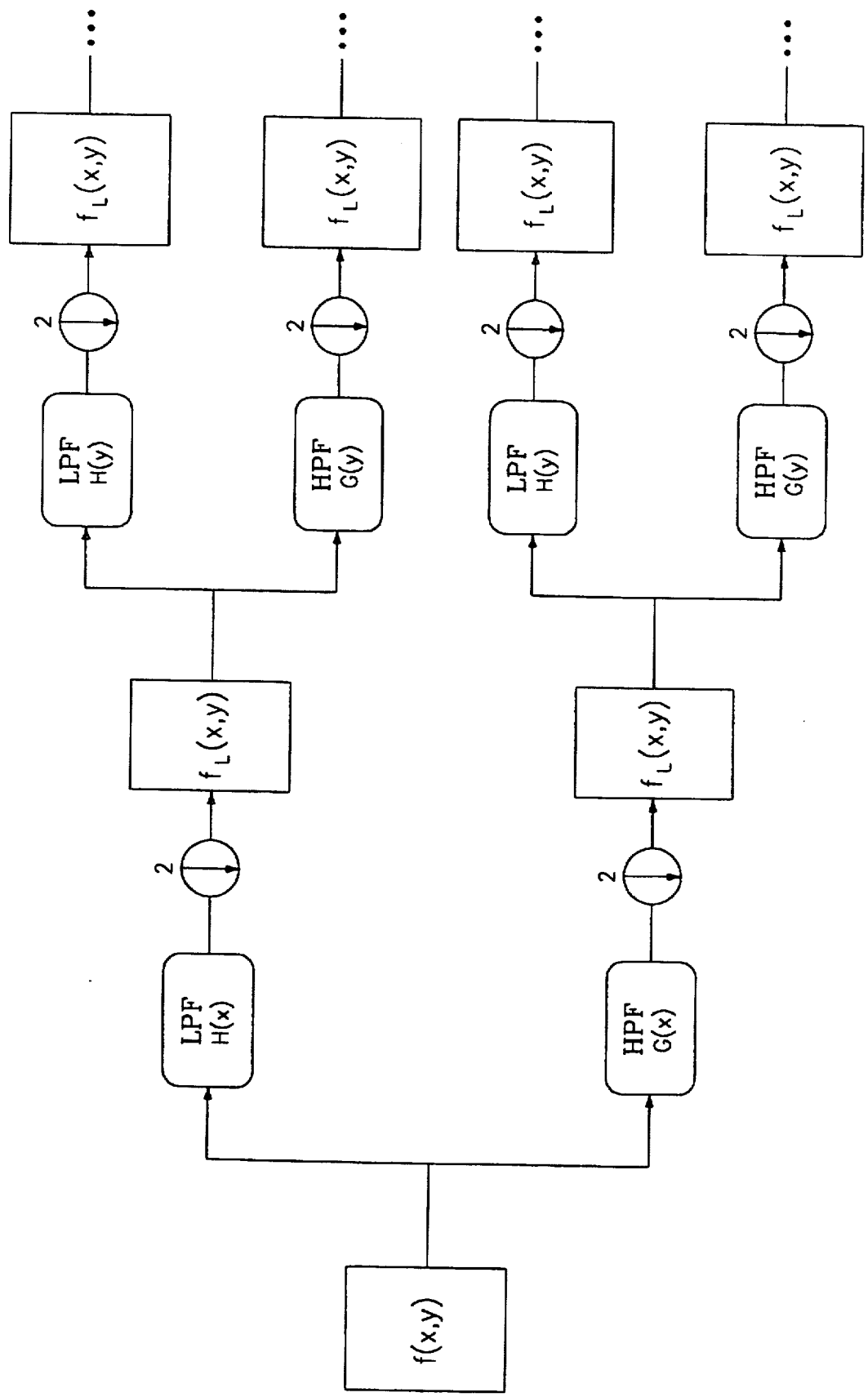
FIG. 5 is a schematic diagram of the two dimensional forward wavelet transform which embodies the decomposition tree of FIG. 3.

Compression subsystem 12 includes a sensor system 16 which receives input signal I and produces a digitized time series of measurement values in accordance with principles known in the art. These values are used by a fast or discrete wavelet transform module 18, as shown in FIG. 5, which functions to generate a wavelet decomposition tree, shown in FIG. 3, and wavelet transform coefficients from these values for each level k of the tree created thereby. As shown in FIG. 3, for each level k during decomposition by fast wavelet module 18 of signal I, the signal of the previous level is split in half, such that where $N_o$ equals the length of the original signal and M equals the number of levels, the signal length N at the deepest level is defined by $N/(2^M)$, and for levels upwardly therefrom, as shown in FIG. 3. Accordingly, signal I has an original length $N_o$ wherein at level 1, length $N_o$ is divided by 2 forming two signals of lengths $N_o/2$ wherein one signal of length $N_o/2$ is then divided by two in a subsequent level k, forming two signals of length $N_o/4$ and so on to $N/8$, $N/16$, etc. In generating wavelet coefficients, fast wavelet module 18 is able to obtain representative wavelets of signal I from a wavelet library 20, in accordance with known principles. The discrete or fast wavelet transform preferably used herein for generating the decomposition tree of FIG. 3, as shown in FIG. 5, including input and output connections to source 16 and module 22, respectively, and its manner of use are known in the art and are therefore, not described in detail here.

Figure 4A:
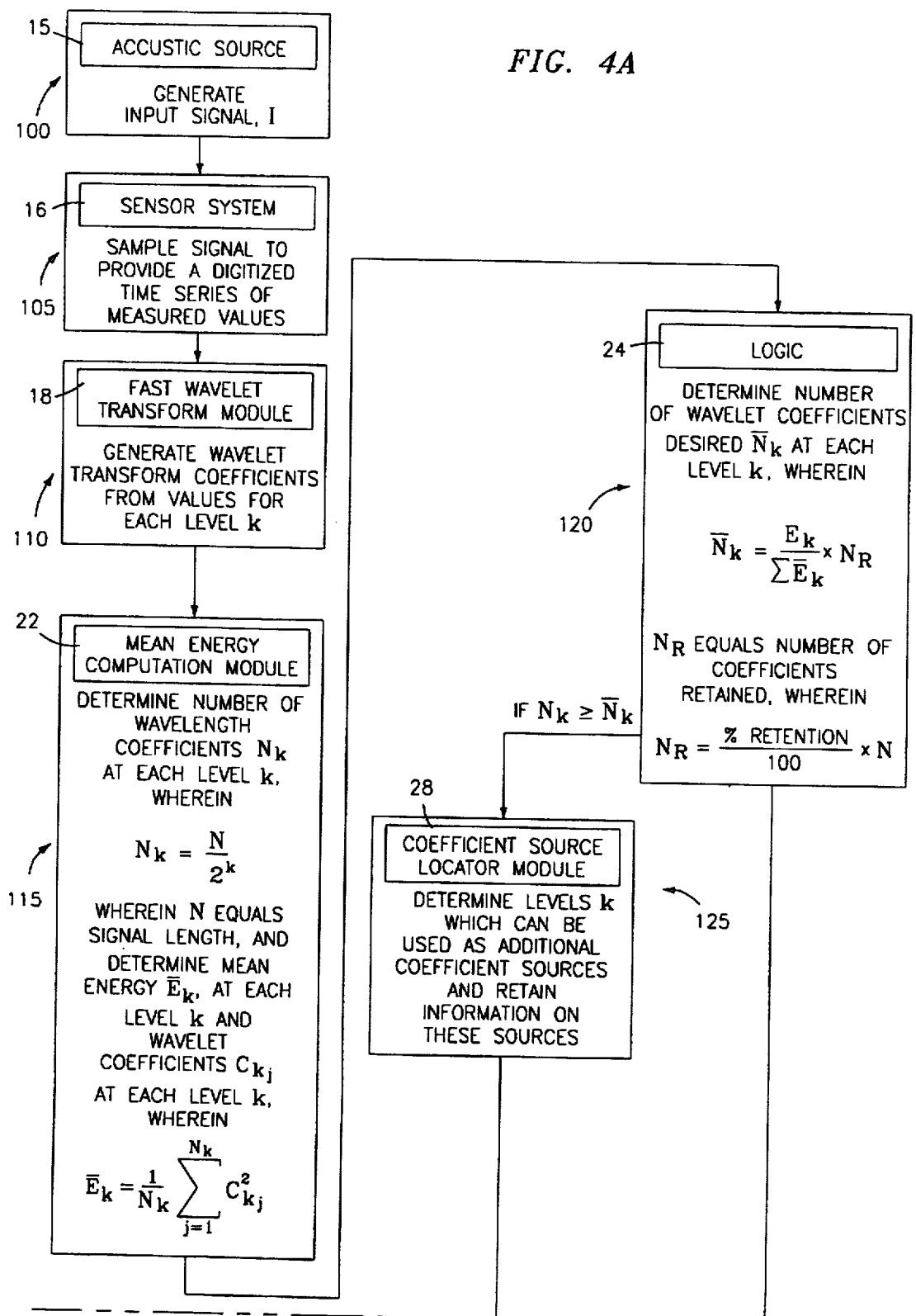
FIGS. 4A and 4B are block diagrams representing the flow of the system and process in accordance with the principles of the present invention.
Figure 4B:
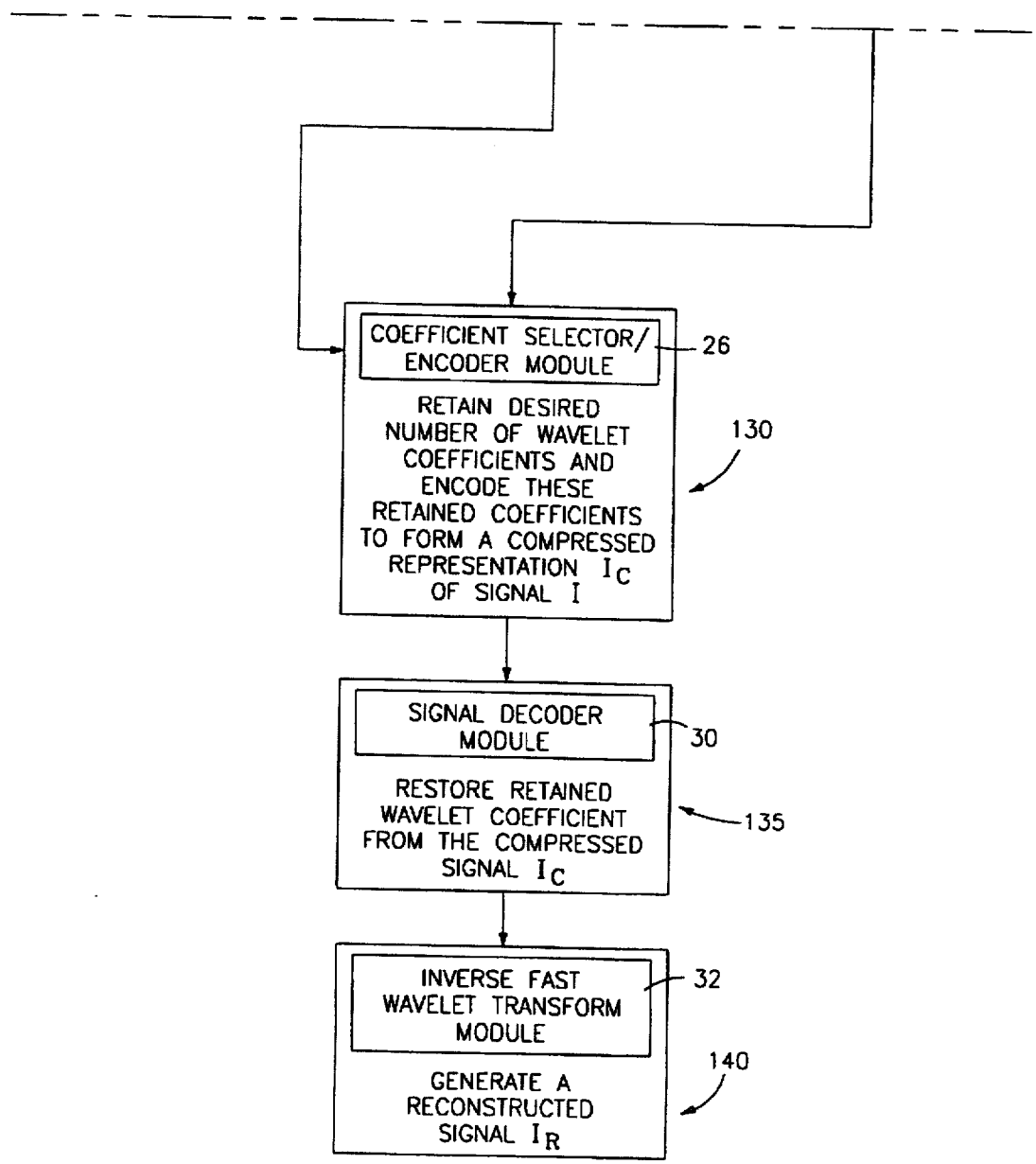

To compress the signal, a group of coefficient selection algorithms 21, including mean energy computation module 22, logic 24 and coefficient source locator module 28, as shown in FIGS. 4A and 4B, is used. Mean energy computation module 22 determines the mean energy contained at each level k of the wavelet decomposition tree, shown in FIG. 3. Thereby, each level k of the wavelet decomposition tree has its own independent threshold for wavelet coefficient selection which is directly dependent on the mean energy of the particular level, in accordance with the equations set forth below. Accordingly, a technique of a local thresholding for each level is achieved. In the mean energy computation module, the mean energy at each level is calculated via the following algorithm; wherein N equals the signal length; (as defined above)

$N_k$ equals number of wavelet coefficients at level k wherein, $$N_k = \frac{N}{2^k} \quad \text{for } k = 1, 2, \ldots M \quad (2)$$

$c_{kj}$ equals the wavelet coefficients at level k, where j equal 1, 2, ... $N_k$; and $E_k$ equals mean energy, wherein $$\overline{E}_k = \frac{1}{N_k} \sum_{j=1}^{N_k} c_{kj}^2 \quad (3)$$

The number of wavelet coefficients $c_{kj}$ selected from a particular level k is proportional to the mean energy contained at that level and is calculated via the equations set forth above. Mean energy computation module uses logic 24 for the calculation of the number of wavelet coefficients to be selected from a particular level based on the mean energy determined to be present. Accordingly, this number is proportional to the mean energy $\overline{E}_k$ contained at that level k. The desired number of wavelet coefficients is calculated via logic 24, wherein $N_R$ equals the number of coefficients retained, as defined by $$\overline{N}_R = \frac{\% \text{ Retention}}{100} \times N; \text{ and} \quad (4)$$

$\overline{N}_k$ equals the desired number of wavelet coefficients, as defined by $$\overline{N}_k = \frac{\overline{E}_k}{\Sigma \overline{E}_k} \times N_R. \quad (5)$$

After logic 24 determines the number of wavelet coefficients at each level k, i.e. $N_k$, and the number of desired wavelet coefficients at level k, i.e. $\overline{N}_k$, a comparison is made between $N_k$ and $\overline{N}_k$. If the actual number of wavelet coefficients is greater than or equal to the desired number of wavelet coefficients, the system moves on to the coefficient selector/encoder module 26. In module 26, the desired number of selected wavelet coefficients $\dot{N}_k$ is retained and compression encoded via coding module 27 to form a compressed representation $I_c$ of the signal I. If, however, the number $N_k$ of wavelet coefficients $c_{kj}$ is less than the desired number $\bar{N}_k$ of wavelet coefficients calculated by logic 24, the system moves on to coefficient source locator module 28, shown in FIG. 4A, and located in coefficient selection algorithm 21. Through module 28, additional wavelet coefficients $c_{kj}$ are located for use at the level k having the insufficient amount of wavelet coefficients $c_{kj}$. Accordingly, coefficient source locator module 28 evaluates and determines other levels which are suitable for use as additional coefficient sources and retains the information on these sources to eliminate the shortage in a particular level. A mean energy hierarchy is established and the level with the greatest mean energy is first used to acquire additional coefficients. Subsequently, the levels with the next highest mean energy are used. Coefficient source locator module 28 preferably uses, for example, the following algorithm in Table 1, herein below, for obtaining the needed wavelet coefficients.

Once the necessary wavelet coefficients are located via locator module 28, preferably using the algorithm of Table 1, the system moves on to coefficient selector/encoder module 26 as described above.

From coefficient selector/encoder module 26, the compressed representation of the signal $I_c$ is preferably stored in memory 29 and forwarded as represented by the arrow in FIG. 2, to a signal decoder module 30 where wavelet coefficients originally retained are restored from the compressed representation $I_c$, in accordance with known principles. After signal/coefficient decoder module 30, the restored wavelet coefficients are utilized to obtain the reconstructed signal via inverse fast wavelet transform module 32 using a wavelet library 34, also in accordance with known principles.

In operation, and referring to FIGS. 4A and 4B, in step 100 input signal I is generated by acoustic source 15 which signal I is then received by sensor system 16. In sensor system 16 and step 105, the signal is sampled to produce a time-series of measurement values. The sampled signal is then processed in step 110 by the fast wavelet transform module 18, in accordance with FIG. 3, to generate the wavelet coefficients $c_{kj}$.

TABLE 1

- For levels k = 1, 2 ... K
  If $N_k > \bar{N}_k$
     Number of coefficients selected from
     level k, $N_k = \bar{N}_k$
  else
     Number of coefficients selected from
     level k, $N_k = \bar{N}_k$
  end if
  Difference between coefficients desired
  and selected at level k, $D_k = \bar{N}_k - N_k$
  end for
- Total additional coefficients desired, $$D = \sum_{k=1}^{k} D_k$$

- While D > 0
  Let level $k_M$ have maximum mean energy:
  i.e. $\bar{E}_{k_M} = \max \{\bar{E}_k\}, k = 1, 2 \ldots K$
  Let number of coefficients desired
  from level $k_M$ be $\bar{N}_{k_M}$
  Let number of coefficients available at
  level $k_M$ be $N_{k_M}$
  If $\bar{N}_{k_M} + D < N_{k_M}$
     Number of coefficients selected TABLE 1-continued from level $k_M$, $\bar{N}_{k_M} = \bar{N}_{k_M} + D$
else
   Number of coefficients selected
from level $k_M$, $\bar{N}_{k_M} = N_{k_M}$
end if
Update total additional coefficients
desired, $D = D - (\bar{N}_{k_M} - \bar{N}_{k_M})$
Eliminate level $k_M$ from further
consideration
end while In step 115, mean energy computation module 22 determines the mean energy at each level k of wavelet decomposition tree, shown in FIG. 3. Accordingly, the desired number of coefficients $\bar{N}_k$ is established for each level, using equation (4) based on the mean energy calculated via equation (2). In step 120, for each level k, if logic 24 determines that the number of coefficients available, $N_k$ via equation (1) is not sufficient to meet the number of wavelet coefficients desired $\bar{N}_k$, control of the method is passed to coefficient source locator module 28 and step 125.

In coefficient source module 28 and step 125, the process determines which levels k of the wavelet decomposition tree, shown in FIGS. 3 and 5, could be used as additional sources of wavelet coefficients based on the energy ranking scheme, and in accordance with the algorithm, given in Table 1. The selection method for selecting the necessary additional wavelet coefficients assures that if the mean energy at a given decompositional level is sufficiently large, some wavelet coefficients from that level will be selected for the compressed representation of the signal. This is in contrast to the global threshold technique of the prior art, wherein the largest coefficients in a universal sense are retained independent of the distribution across levels. In general, it has been observed that the energy based selection method retains wavelet coefficients across a broader spectrum of levels in the decomposition tree.

In step 130, coefficient selector/encoder module 26 then retains a desired number of coefficients based on input from logic 24, and if necessary including additional coefficients from the sources provided by coefficient source locator module 28, and encodes the wavelet coefficients to form a compressed representation $I_c$ of signal I. The compressed representation $I_c$ is then passed on to signal decoder module 30 which functions to restore the selected wavelet coefficients from the compressed signal. And finally, the signal is passed on to the inverse fast wavelet transform module 32 where the compressed signal is reconstructed, creating signal $I_R$.

An example of the present invention and a comparison between the energy based method (E) of the present invention and the global thresholding method (G) is provided by the following Table 2. Table 2 shows the number of wavelet coefficients retained at each level for each method for different retention percentages along with the signal-to-error ratio (SER) in decibels.

TABLE 2

| % Ret. | 2 | | 5 | | 10 | | 20 | | 40 | |
|---|---|---|---|---|---|---|---|---|---|---|
| Level (K) | G | E | G | E | G | E | G | E | G | E |
| 1 | 1 | 2 | 4 | 6 | 19 | 11 | 78 | 23 | 178 | 45 |
| 2 | 12 | 8 | 35 | 21 | 64 | 41 | 97 | 83 | 158 | 175 |
| 3 | 6 | 6 | 11 | 14 | 18 | 28 | 26 | 57 | 52 | 115 |
| 4 | 1 | 1 | 1 | 4 | 1 | 7 | 1 | 14 | 12 | 28 |
| 5 | | 1 | | 3 | | 6 | 1 | 12 | 7 | 24 |
| 6 | | 1 | | 3 | | 6 | 2 | 12 | 3 | 16 |
| 7 | | | | 1 | | 2 | | 3 | | 6 |
| 8 | | | | | | | | | | 1 |
| 9 | | | | | | | | | | |
| 10 | | | | | | | | | | |
| Total | 20 | 19 | 51 | 52 | 102 | 101 | 205 | 204 | 410 | 410 |
| SER | 1.60 | 1.69 | 2.73 | 3.02 | 3.95 | 4.82 | 5.84 | 7.56 | 9.54 | 11.59 |

The distribution of selected wavelet coefficients across the various resolution levels is listed in Table 2 for different retention percentages. For example, for a 10% retention of the porpoise signal using the conventional global thresholding method, coefficients from levels 1 through 4 are selected. In contrast, using the mean energy based method of the present invention, coefficients are selected from levels 1 through 7. In a physical sense, this means that details of the original signal across a wider range of resolution levels are utilized in the reconstruction of the signal, in comparison to the global thresholding technique.

Figure 6:
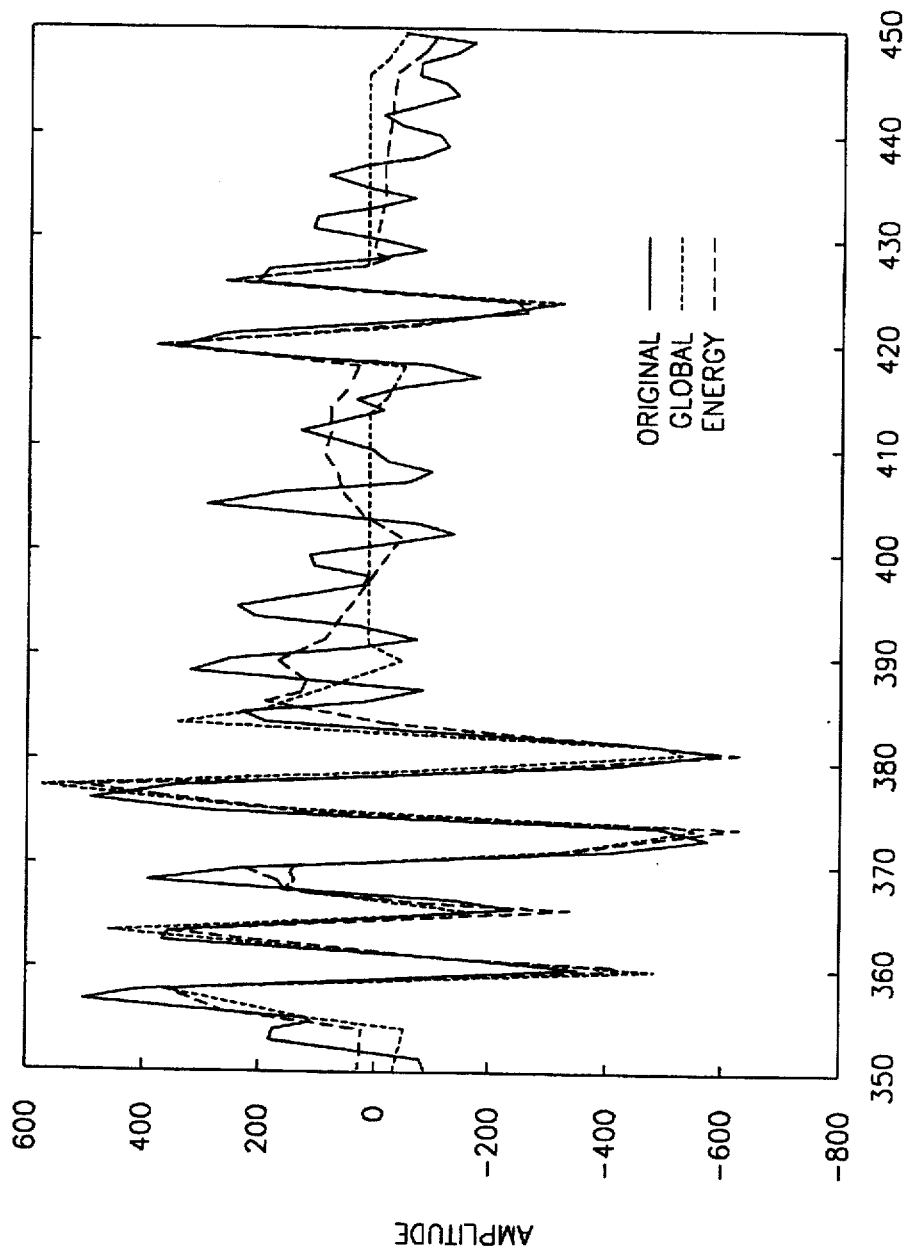
FIG. 6 is a graph of a sample signal processed in accordance with the system and method of the present invention.
Figure 7A:
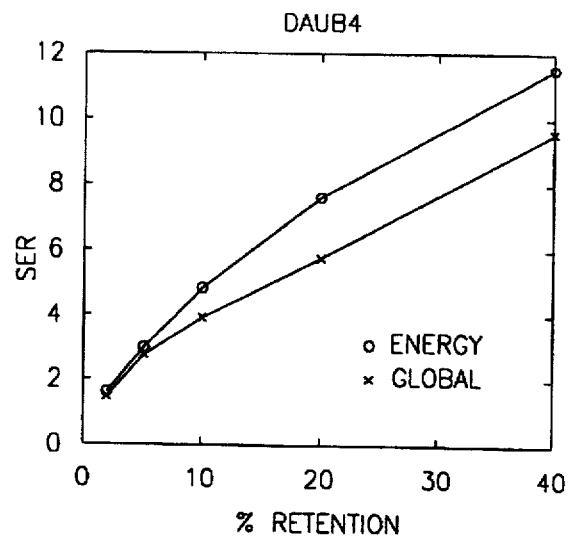
FIGS. 7A-7D are a group of graphs indicating a reduction in signal reconstruction error for the system and method of the present invention in comparison to that of the prior art.
Figure 7B:
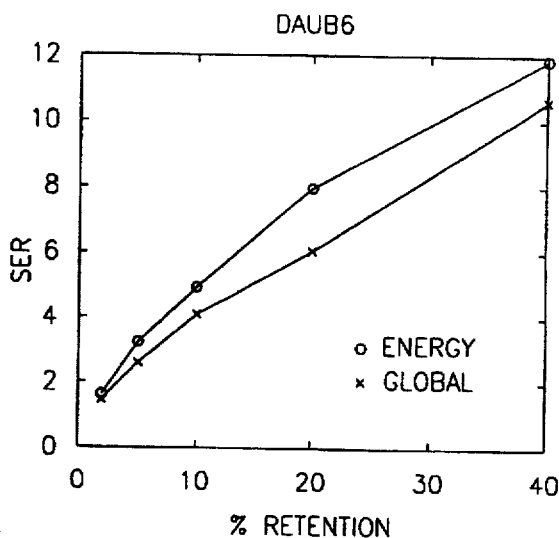
Figure 7C:
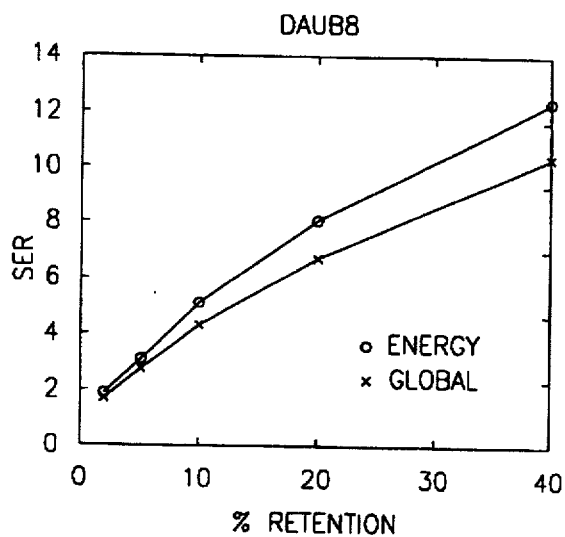
Figure 7D:
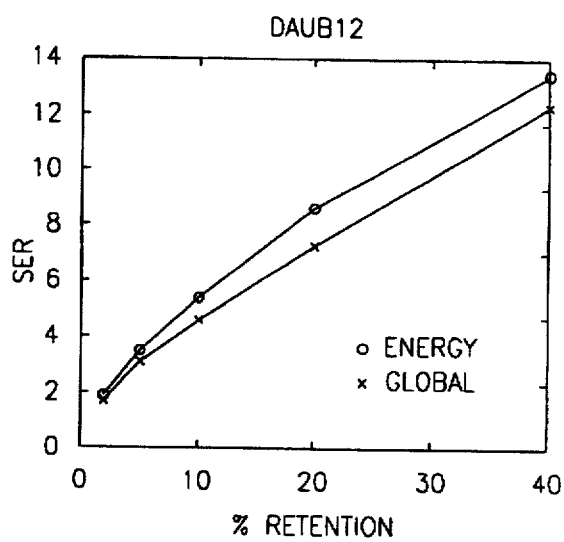

The resulting enhancement in the signal reconstruction with the energy based method of the present invention is shown in FIG. 6 for 10% retention with the Daubechies 4 wavelet basis. As shown here, the reconstructed signal obtained from the energy based compression of the present invention is compared to the reconstructed signal obtained from global thresholding, for the porpoise signal. The energy based method of the present invention retains significantly more finer detail of the original signal than the global thresholding method, which can be seen in FIG. 6 by zooming in on a segment of the porpoise signal reconstruction. A tradeoff is observed to occur in the large-amplitude regions of the reconstructed signal. Since global thresholding retains the largest coefficients overall, some of the peak amplitudes are reproduced more accurately than for the energy based reconstruction of the present invention. However, this effect does not represent a significant loss of information in the energy based signal reconstruction as the overall trend of greater efficiency is still retained. As can be observed from Table 2, the SER increases for each % retention for the energy based method of the present invention as compared to the prior art global thresholding method. Accordingly, as the SER increases, the amount of error decreases. This increase in SER is shown further by the graphs of FIGS. 7A–7D, where for each graph SER increases as % retention increases and a clear improvement over the prior art is evident.

Another example comparing the energy based method of the present invention and the global thresholding method of the prior art are indicated by Table 3. Table 3 indicates that the wavelet coefficient selection distribution, for a vehicle A signal on Daubechies 12, progresses deeper into the decomposition tree for the energy based method of the present invention than for the global thresholding method of the prior art.

TABLE 3

| % Ret. | 2 | | 5 | | 10 | | 20 | | 40 | |
|---|---|---|---|---|---|---|---|---|---|---|
| Level | G | E | G | E | G | E | G | E | G | E |
| 1 | 117 | 119 | 493 | 298 | 1040 | 596 | 2115 | 1193 | 4070 | 2386 |
| 2 | 151 | 125 | 324 | 313 | 588 | 626 | 1068 | 1253 | 1960 | 2505 |
| 3 | | 41 | 2 | 103 | 10 | 206 | 86 | 412 | 440 | 823 |
| 4 | | 22 | | 54 | | 108 | 8 | 215 | 79 | 430 |
| 5 | | 11 | | 28 | | 57 | | 113 | 5 | 226 |
| 6 | | 5 | | 12 | | 23 | | 46 | | 93 |
| 7 | | 2 | | 6 | | 12 | | 24 | | 48 |
| 8 | | 1 | | 3 | | 6 | | 11 | | 23 |
| 9 | | 1 | | 2 | | 4 | | 7 | | 15 |
| 10 | | | | | | | 1 | 1 | | 3 |
| 11 | | | | | | | 1 | 1 | | 2 |
| 12 | | | | | | | | | | |
| 13 | | | | | | | | | | |
| 14 | | | | | | | | | | |
| Total | 328 | 327 | 819 | 819 | 1638 | 1640 | 3277 | 3276 | 6554 | 6554 |
| SER | 0.54 | 0.60 | 1.13 | 1.32 | 1.98 | 2.40 | 3.58 | 4.44 | 6.82 | 8.46 |

It can clearly be seen from the Table 3 that the wavelet coefficient distribution for vehicle A spans across more levels when using the energy based technique. These results indicate that a direct correlation exists between the reconstruction performance using the energy based method and the more efficient coefficient distribution in the decomposition tree.

In accordance with the above disclosure and examples, the primary advantage of the energy based method of the present invention is that there is a strong tendency to select wavelet coefficients from a broader spectrum of levels than in prior art methods such as the global thresholding method. In particular, the energy method is biased toward selecting coefficients from deeper in the wavelet decomposition tree since mean energy tends to increase with increasing level number. This is because the total number of coefficients $N_k$ at level k, defined by equation (1), decreases as k increases, tending to push up the overall average.

The primary advantage of this invention is that a system and method for signal processing is provided which uses wavelet coefficients for compressing and reconstructing signals, which coefficients are selected from a broader spectrum of decomposition levels than in known systems and methods. Another advantage of this invention is that an improved and more efficient signal processing system and method is provided, which system and method uses wavelet coefficients for compressing and reconstructing signals, wherein such wavelet coefficients are selected deeper into the wavelet decomposition tree according to respective increases in mean energy at these depths. Still another advantage of this invention is that a system and method for signal processing using wavelet coefficients is provided, which system and technique uses local thresholding, wherein each level of a wavelet decomposition tree used therefor has its own independent threshold for coefficient selection, thereby increasing the overall efficiency and accuracy of signal reconstruction. And still another advantage of this invention is that a signal processing system and method which uses wavelet coefficients for compressing and reconstructing the processed signal is provided, which wavelet coefficients are selected from an increased plurality of levels of a wavelet decomposition tree based on the mean energy of each level.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A signal processing system, comprising:

means for generating a wavelet decomposition tree modeling said signal, wherein said tree includes a plurality of levels of wavelet coefficients representative of said signal;

means for determining the number of wavelet coefficients available at each of said plurality of levels;

means for measuring mean energy for each of said plurality of levels;

means for determining a number of wavelet coefficients to be retained for each of said plurality of levels based on said measured mean energy, wherein said mean energy measured for each of said plurality of levels is indicative of said number of wavelet coefficients selected from each of said plurality of levels; and means for retaining said number of wavelet coefficients and forming a compressed representation of said signal.

2. A signal processing system, comprising:

means for generating a wavelet decomposition tree modeling said signal, wherein said tree includes a plurality of levels of wavelet coefficients representative of said signal;

means for determining the number of wavelet coefficients available at each of said plurality of levels;

means for measuring mean energy for each of said plurality of levels;

means for determining a number of wavelet coefficients for each of said plurality of levels based on said mean energy, wherein said mean energy measured for each of said plurality of levels is indicative of said number of wavelet coefficients selected from each of said plurality of levels;

means for retaining said number of wavelet coefficients and forming a compressed representation of said signal; and means for locating additional wavelet coefficients if said number of wavelet coefficients is less than said desired number.

3. The system according to claim 2, further including means for evaluating which of said levels are suitable for use as sources for additional wavelet coefficients.

4. The system according to claim 3, wherein said means for evaluating comprises means for determining a mean energy level hierarchy with respect to the amount of mean energy in said levels, wherein said additional wavelet coefficients are selected starting from said levels in said hierarchy beginning with said levels of said hierarchy having the highest mean energy.

5. A signal processing system, comprising:

means for generating a wavelet decomposition tree modeling said signal, wherein said tree includes a plurality of levels of wavelet coefficients representative of said signal;

means for determining a number of wavelet coefficients available at each of said plurality of levels;

means for measuring mean energy for each of said plurality of levels;

means for determining a number of wavelet coefficients for each of said plurality of levels based on said mean energy, wherein said mean energy measured for each of said plurality of levels is indicative of said number of wavelet coefficients selected from each of said plurality of levels;

means for retaining said number of wavelet coefficients and forming a compressed representation of said signal; and said means for retaining further including means for encoding said desired wavelet coefficients retained.

6. The system according to claim 1, wherein said means for measuring comprises a mean energy computation module.

7. A signal processing system, comprising:

means for generating a wavelet decomposition tree modeling said signal, wherein said tree includes a plurality of levels of wavelet coefficients representative of said signal, said means for generating comprising a fast wavelet transform module;

means for determining the number of wavelet coefficients available at each of said plurality of levels;

means for measuring mean energy for each of said plurality of levels;

means for determining a number of wavelet coefficients for each of said plurality of levels based on said mean energy, wherein said mean energy measured for each of said plurality of levels is indicative of said number of wavelet coefficients selected from each of said plurality of levels; and means for retaining said number of wavelet coefficients and forming a compressed representation of said signal.

8. The system according to claim 1, further including means for reconstructing said compressed representation.

9. A signal processing system, comprising:
   means for generating a wavelet decomposition tree modeling said signal, wherein said tree includes a plurality of levels of wavelet coefficients representative of said signal;
   means for determining the number of wavelet coefficients available at each of said plurality of levels;
   means for measuring mean energy for each of said plurality of levels;
   means for determining a number of wavelet coefficients for each of said plurality of levels based on said mean energy, wherein said mean energy measured for each of said plurality of levels is indicative of said number of wavelet coefficients selected from each of said plurality of levels;
   means for retaining said number of wavelet coefficients and forming a compressed representation of said signal; and
   means for reconstructing said compressed representation, said means for reconstructing comprising an inverse fast wavelet transform module.

10. A signal processing method, comprising the steps of:
    generating a wavelet decomposition tree modeling said signal, wherein said tree includes a plurality of levels of wavelet coefficients representative of said signal;
    determining the actual number of wavelet coefficients available at each of said plurality of levels;
    measuring mean energy for each of said plurality of levels;
    determining a number of wavelet coefficients to be retained for each of said plurality of levels based on said mean energy determined in said step of measuring, wherein said mean energy in said step of measuring for each of said plurality of levels is indicative of said number of wavelet coefficients selected from each of said plurality of levels; and
    retaining said number of wavelet coefficients and forming a compressed representation of said signal.

11. A signal processing method, comprising the steps of:
    generating a wavelet decomposition tree modeling said signal, wherein said tree includes a plurality of levels of wavelet coefficients representative of said signal;
    determining the actual number of wavelet coefficients available at each of said plurality of levels;
    measuring mean energy for each of said plurality of levels;
    determining a number of wavelet coefficients for each of said plurality of levels based on said mean energy determined in said step of measuring, wherein said mean energy in said step of measuring for each of said plurality of levels is indicative of said number of wavelet coefficients selected from each of said plurality of levels;
    retaining said number of wavelet coefficients and forming a compressed representation of said signal; and
    locating additional wavelet coefficients if said number of wavelet coefficients is less than said desired number.

12. The method according to claim 11, further including the step of evaluating which of said levels are suitable for use as sources for additional wavelet coefficients.

13. The method according to claim 12, wherein said step of evaluating comprises the step of determining a mean energy level hierarchy with respect to said the amount of mean energy in said levels, wherein said additional wavelet coefficients are selected starting from said levels in said hierarchy beginning with said levels of said hierarchy having the highest mean energy.

14. The method according to claim 11, wherein said step of locating comprises the steps of:
    comparing said desired number of wavelet coefficients to said actual number of wavelet coefficients for each of said plurality of levels;
    determining the difference between said desired number of wavelet coefficients and said actual number of wavelet coefficients if said desired number is greater than said actual number;
    finding a one of said plurality of levels with the maximum amount of mean energy and determining the number of said wavelet coefficients available from said one of said plurality of levels;
    obtaining said wavelet coefficients available as determined in said step of finding and determining the number of wavelet coefficients still desired; and
    eliminating said one of said plurality of levels from further consideration for wavelet coefficients.

15. The method according to claim 14, further including the step of finding another one of said plurality of levels having the maximum amount of mean energy with respect to remaining ones of said plurality of levels and determining the number of said wavelet coefficients available from said another one of said plurality of levels.

16. The method according to claim 10, wherein said step of retaining includes the step of encoding said desired wavelet coefficients retained in said step of retaining.

17. A signal processing method, comprising the steps of:
    generating a wavelet decomposition tree modeling said signal, wherein said tree includes a plurality of levels of wavelet coefficients representative of said signal, said step of generating using a fast wavelet transform module;
    determining the actual number of wavelet coefficients available at each of said plurality of levels;
    measuring mean energy for each of said plurality of levels;
    determining a number of wavelet coefficients for each of said plurality of levels based on said mean energy determined in said step of measuring, wherein said mean energy in said step of measuring for each of said plurality of levels is indicative of said number of wavelet coefficients selected from each of said plurality of levels; and
    retaining said number of wavelet coefficients and forming a compressed representation of said signal.

18. The method according to claim 10, further comprising the step of determining the length of said signal.

19. The method according to claim 10, further including the step of reconstructing said compressed representation.

20. The method according to claim 10, wherein said step of determining a desired number includes the step of determining the number of wavelet coefficients retained.

* * * * *